US012623222B2

(12) United States Patent
Bransky et al.

(10) Patent No.: US 12,623,222 B2

(45) Date of Patent: May 12, 2026

(54) DEVICES FOR EXTRACTING A FLUID SAMPLE FROM A CLOSED CHAMBER AND METHODS OF USE THEREOF

(71) Applicant: Pixcell Medical Technologies Ltd., Yokneam Ilit (IL)

(72) Inventors: Avishay Bransky, Kiryat-Tivon (IL); Liron Shlomo, Kibbutz Shomrat (IL)

(73) Assignee: PixCell Medical Technologies Ltd, Yokneam Ilit (IL)

(*) Notice: Subject to any disclaimer, the term of this patent is extended or adjusted under 35 U.S.C. 154(b) by 588 days.

(21) Appl. No.: 17/414,556

(22) PCT Filed: Dec. 17, 2018

(86) PCT No.: PCT/IB2018/001528

§ 371 (c)(1),
(2) Date: Jun. 16, 2021

(87) PCT Pub. No.: WO2020/128549

PCT Pub. Date: Jun. 25, 2020

(65) Prior Publication Data

US 2022/0008911 A1 Jan. 13, 2022

(51) Int. Cl.
*B01L 3/00* (2006.01)

(52) U.S. Cl.
CPC ....... *B01L 3/508* (2013.01); *B01L 2200/0689* (2013.01); *B01L 2400/0406* (2013.01); *B01L 2400/0694* (2013.01)

(58) Field of Classification Search
CPC ............ B01L 3/508; B01L 2200/0689; B01L 2400/0406; B01L 2400/0694; B01L 3/563; B01L 2200/026; B01L 2200/0605; B01L 2300/0838; B01L 2400/0478; B01L 3/502; B01L 3/50825; B01L 9/065
See application file for complete search history.

(56) References Cited

U.S. PATENT DOCUMENTS

| | | | | |
|---|---|---|---|---|
| 4,808,381 | A | 2/1989 | McGregor et al. | |
| 4,960,412 | A * | 10/1990 | Fink | A61M 39/0606 604/167.04 |
| 6,537,827 | B1 | 3/2003 | Pawliszyn | |
| 6,626,863 | B1 | 9/2003 | Berler | |
| 6,803,021 | B1 | 10/2004 | Bertling | |
| 8,506,813 | B2 | 8/2013 | Alspektor | |
| 2006/0060531 | A1 * | 3/2006 | Coville | B01D 61/18 210/257.2 |

(Continued)

FOREIGN PATENT DOCUMENTS

WO WO 2020/128549 6/2020

OTHER PUBLICATIONS

International Preliminary Report on Patentability Dated Jun. 16, 2021 From the International Bureau of WIPO Re. Application No. PCT/IB2018/001528. (6 Pages).

(Continued)

*Primary Examiner* — Samuel P Siefke

(57) ABSTRACT

The invention relates to a device for extracting a fluid sample from a closed chamber and providing access to a volume of the extracted fluid sample for subsequent collection via a sampler device associated with a cartridge for delivering the volume of extracted fluid sample to a compatible diagnostic instrument for analyzing the fluid sample.

17 Claims, 14 Drawing Sheets

(56) References Cited

U.S. PATENT DOCUMENTS

2007/0015276 A1 1/2007 LeBlanc et al.

OTHER PUBLICATIONS

International Search Report and the Written Opinion Dated Jul. 22, 2019 From the International Searching Authority Re. Application No. PCT/IB2018/001528. (10 Pages).

International Search Report and Written Opinion mailed Jul. 22, 2019 in PCT International Application PCT/IB2018/001528, 8 pages.

* cited by examiner

Draw a fluid sample out of a collection tube with a pipette.

Apply a volume of fluid sample upon a clean, flat surface.

Insert an open end of a capillary of a sampler member into contact with fluid sample, thereby causing a volume of the fluid sample to flow into the capillary by way of capillary action.

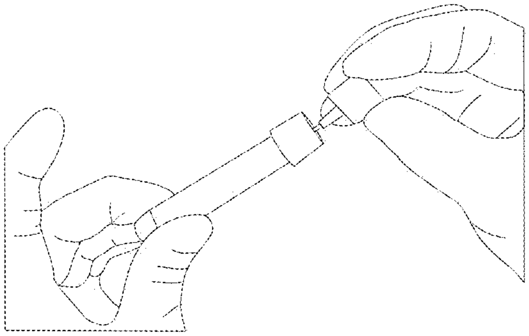

Penetrate a seal of a closed chamber that comprises a fluid sample with the hollow piercing member of the device.

FIG. 16A

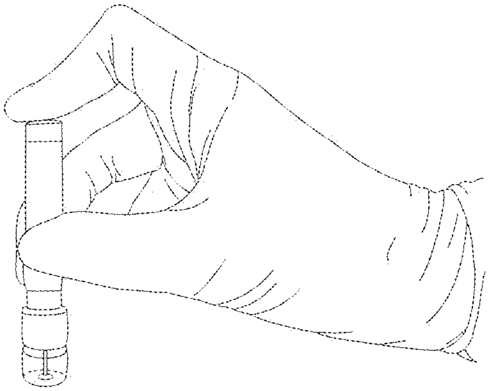

Perform pumping action between closed chamber and the first component to cause a portion of the fluid sample to flow from the closed chamber, through the hollow piercing member, and into the reservoir of the device.

FIG. 16B

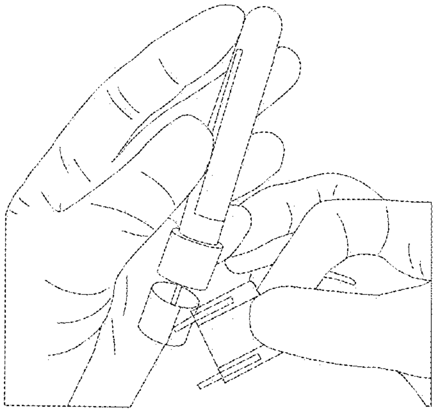

Insert an open end of a capillary of sampler member through the opening in the sidewall and into the portion of the fluid sample in the reservoir, thereby causing a portion of the fluid sample in the reservoir to be loaded into the capillary of sampler device.

FIG. 16C

DEVICES FOR EXTRACTING A FLUID SAMPLE FROM A CLOSED CHAMBER AND METHODS OF USE THEREOF

FIELD OF THE INVENTION

The invention generally relates to devices for extracting a fluid sample from a closed chamber and methods of use thereof.

BACKGROUND

Hematology analyzers are used widely in patient and research settings to count and characterize blood cells for disease detection and monitoring. Basic analyzers return a complete blood count (CBC) with a three-part differential white blood cell (WBC) count. Sophisticated analyzers measure cell morphology and can detect small cell populations to diagnose rare blood conditions.

More recently, miniature hematology analyzers have been developed. Such miniature systems are portable, which allow for Point of Care sample testing, such as complete blood count (CBC) parameters (including leukocyte differential count). Such systems typically employ a disposable self-contained cartridge and a sampler. The cartridge is used to prepare and measure the sample, while the sampler is used for the accurate collection of the blood sample itself. In certain designs, the sampler includes a capillary for sample collection, which facilitates collecting blood from a finger prick or a small test tube, such as a MINICOLLECT Tube (blood collection tube) sold by Greiner or a VACUTAINER (blood collection tube) sold by Greiner.

Collecting a sample from a standard blood collection tube has proven to be very challenging due to the capillary orientation (angle) required in order to fill the capillary using passive capillary action. Tilting the blood sample tube at such an angle may result in spilling the sample out of the tube or smearing the outside of the capillary. Moreover, if the tube is only partially filled (which is usually the case) then the tip of the capillary will not reach the sample unless the tube is tilted almost horizontally, again introducing the risk of spilling the sample or smearing the outside of the capillary.

To address that issue, an approach was developed that involved drawing some sample out of the blood sample tube using a pipette and applying it to a clean flat surface. The sample was then drawn into the capillary from the drop of blood formed on the surface. That technique has several drawbacks, such as it requires several cumbersome steps that require expertise and training and requires additional accessories (e.g. pipette, surface, etc.). Additionally, the blood collection tube is required to be opened, exposing the sample to possible contamination. Also, the user is exposed to blood that is on pipette and on the surface.

SUMMARY

The present invention recognizes the drawbacks of current methods of collecting biological samples and provides devices for safely and efficiently extracting a fluid sample from a closed chamber. Further, the devices and methods of the invention provide for easy access by a capillary, such as those associated with a sampler, to a biological sample that has been extracted from the closed tube without awkward manipulations or positioning of the sample or the capillary. In that manner, the devices and methods of the invention allow for the collection of a sample, such as a blood sample, without opening of the sample collection tube, thereby avoiding contamination issues while also allowing an operator to avoid exposure to the sample that has been collection.

Aspects of the invention are accomplished with a device that includes a first component comprising a hollow piercing member and a second component comprising a reservoir arranged to receive a fluid sample from the hollow piercing member. The hollow piercing member is configured to penetrate a seal of a closed chamber that includes a fluid sample (e.g., a blood collection tube), and upon entering the closed chamber, a portion of the fluid sample may flow from the closed chamber, via a pumping action, and through the hollow piercing member, and into the reservoir.

The second component of the device includes an opening in a sidewall of the reservoir to permit access to the fluid sample collected in the reservoir. In exemplary embodiments, the opening in the sidewall is generally sized to receive an open end of a capillary tube of a sampler device, and the opening is sized to permit angled entry of the capillary tube therethrough. The reservoir is configured to retain a volume of fluid sample by way of capillary force to thereby prevent undesired flow of fluid sample through the opening in the sidewall.

Accordingly, the devices of the present invention are able to extract a fluid sample from a closed chamber while maintaining the chamber in a closed state, thereby preventing risk of contamination to the entirety of the fluid sample stored within the closed chamber and further preventing risk of cross-contamination to the extracted fluid sample. The devices of the invention further allow for relative ease of collection of a volume of fluid sample from the reservoir via a collection tube (i.e., capillary tube) of a sampler device, as the opening in the sidewall allows for proper alignment and capillary orientation of the collection tube, such that any operator, regardless of skill or expertise, can collect a volume of fluid sample. Furthermore, fluid sample is maintained within the reservoir due to the presence of weak capillary forces, even in the event that the device and closed chamber (from which the fluid sample is extracted) are manipulated (i.e., moved around and/or tilted at varying angles), thereby preventing spillage of the fluid sample while still permitting withdrawal of a volume of fluid sample via the collection tube of the sampler device. The device design further obviates the need for a separate pipette and/or disposable clean-surface previously required, thereby preserving a clean and safe working environment.

One aspect of the invention provides a device for extracting a fluid sample from a closed chamber. The device includes a first component comprising a hollow piercing member and a second component comprising a reservoir arranged to receive a fluid sample from the hollow piercing member, wherein the second component comprises an opening in a sidewall of the reservoir to permit access to the fluid sample collected in the reservoir.

In certain embodiments, the first component may include a pumping mechanism, which may be in the form of flanged member (i.e., a step or an abrupt increase in diameter) configured to engage and apply pressure upon a seal in a cap of the closed chamber. Accordingly, upon pressing the closed chamber against the first component, the flanged member or step of the first component presses against the seal, which, in turn, creates pumping motions (via the flexibility of the seal), thereby creating pressure within the closed chamber and causing fluid sample to expel from the closed chamber, through the hollow piercing member, and subsequently into the reservoir.

In some embodiments, the reservoir is configured to retain a volume of fluid sample within the reservoir by way of capillary force to thereby prevent undesired flow of fluid sample through the opening in the sidewall. In one embodiment, the opening in the sidewall is located proximate a top of the reservoir. In one embodiment, the opening in the sidewall is sized to receive an open end of a capillary. In one embodiment, the opening in the sidewall is sized to permit angled entry of a sample member through the opening.

The device is configured such that transfer of the fluid sample through the hollow piercing member to the reservoir becomes ineffective once a proximal end of the hollow piercing member is submerged in the fluid sample in the reservoir. In particular, the hollow piercing member comprises a proximal end adjacent to the reservoir of the second component and an opposing distal tip configured to pierce or penetrate a seal or stopper of a closed chamber (i.e., tube or vial, such as a vacutainer tube). Flow of fluid sample into the reservoir ceases and pumping action (i.e., pressing of the closed chamber upon the device) once the reservoir reaches a filled volume and no more fluid sample can be extracted from the closed chamber until a volume of fluid sample is withdrawn from the reservoir.

In some embodiments, at least the second component is optically transparent. Accordingly, an operator may easily observe the extraction of fluid sample into the reservoir to determine when it is full and further observe contact of a collection tube of a sampler device with fluid sample in the reservoir, thereby assisting the operator with withdrawal of a volume of fluid sample from the reservoir.

In some embodiments, a base of the second component may be sized and configured to allow for pressing of the closed chamber against the device while the device is on a surface, without the device slipping on the surface. This design further allows for an operator to perform pumping motion to expel fluid sample from the closed chamber into the device.

In some embodiments, the first and second components may be integrally formed with each other. In other words, the first and second components may be a single piece formed monolithically.

In other embodiments, the first and second components may be separate components that operably couple to each other. For example, in some embodiments, the first and second components may be operably coupled to one another by way of a snap-fit connection, and the second component may include one or more teeth that prevent disengagement of the first and second components from one another. The two-piece construction design may allow for rapid manufacturing reconfigurations of either component with minimal costs to create new devices that meet specific needs, thereby benefitting both end-users and manufacturing strategy. In particular, in some embodiments, the first component may be changed depending on specific needs or requirements, which may include, for example, different closed chamber sizes and/or sizes/thicknesses of the seal of the closed chamber, and the like. Similarly, the second component may be changed depending on specific needs or requirements, which may include, for example, different reservoir volumes (depending on the volume of fluid sample required for a given diagnostic test), different sizes/dimensions of sidewall openings depending on the size/dimension of collection tube of sampler device, and the like. Yet still, the second component may be formed by way of an injection mold construction and is devoid of undercuts. Furthermore, in some embodiments, the second component may be constructed to operably couple to off-the-shelf, commercially available first components.

Another aspect of the invention includes a method for loading a sample member. The method includes providing a device comprising a first component comprising a pumping mechanism and a hollow piercing member and a second component comprising a reservoir arranged to receive a fluid sample from the hollow piercing member, wherein the second component comprises an opening in a sidewall of the reservoir to permit access to the fluid sample collected in the reservoir. The method further comprises penetrating a seal of a closed chamber that comprises a fluid sample with the hollow piercing member of the device such that a distal end of the hollow piercing member enters the fluid sample, pumping the first component to cause a portion of the fluid sample to flow from the closed chamber, through the hollow piercing member, and into the reservoir, and inserting an open end of a sample member through the opening in the sidewall and into the portion of the fluid sample in the reservoir, thereby causing a portion of the fluid sample in the reservoir to be loaded into the sample member. In some embodiments, the fluid sample is a blood sample. It should be noted, however, that the fluid sample may include any biological sample, including any human bodily fluid.

BRIEF DESCRIPTION OF THE DRAWINGS

FIGS. 16A, 16B, and 16C illustrate a sequence of steps for extracting fluid sample from a closed chamber with a device and further loading a sampler device with a volume of extracted fluid sample retained within a reservoir of the device.

DETAILED DESCRIPTION

The present invention is directed to a device for safely and efficiently extracting a fluid sample from a closed chamber, and further providing access to a volume of the extracted fluid sample for subsequent collection via a sampler device associated with a cartridge for delivering the volume of extracted fluid sample to a compatible diagnostic instrument for analyzing the fluid sample.

Collecting a biological sample from a collection tube has proven to be very challenging, particularly when attempting to use a capillary of a sampler device. In particular, tilting the collection tube at an angle so as to attain the proper capillary orientation required in order to fill the capillary may result in spilling the sample out of the tube or smearing the outside of the capillary. Moreover, if the tube is only partially filled then the tip of the capillary will not reach the sample unless the tube is tilted almost horizontally, again introducing the risk of spilling the sample or smearing the outside of the capillary.

Figure 1A:
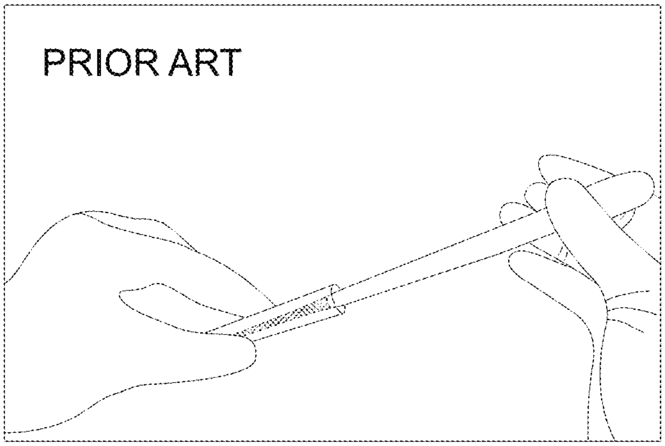
FIGS. 1A, 1B, and IC illustrate a prior art approach for obtaining a volume of blood from a sample tube and subsequently collecting the blood in a capillary, such as those associated with a sampler.
Figure 1B:
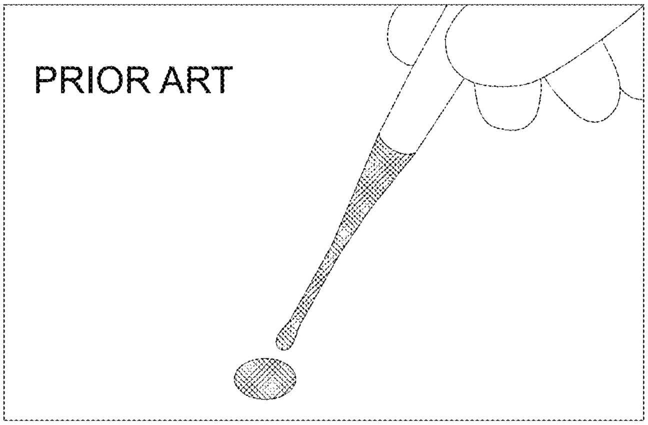
Figure 1C:
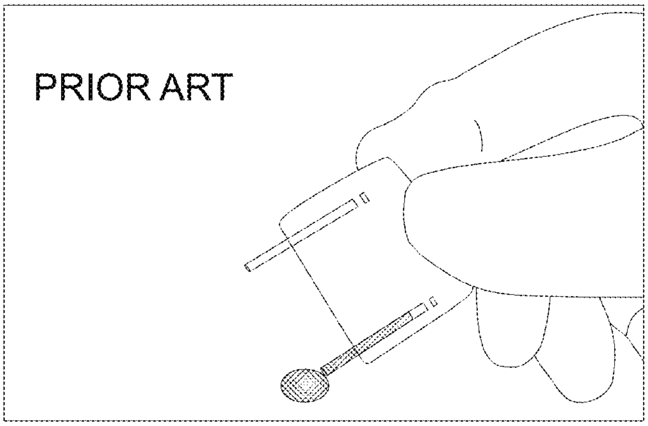

In an attempt to address such issues, an approach was developed for obtaining a volume of fluid sample from a collection tube and subsequently collecting the blood in a capillary associated with a sampler device. In particular, FIGS. 1A-1C illustrate such a prior approach, which involves drawing a sample out of a sample tube using a pipette (FIG. 1A) and applying it to a clean flat surface (FIG. 1B). The drop of sample formed on the clean flat surface is then drawn into the capillary (FIG. 1C). However, this technique has several drawbacks, such as it requires several cumbersome steps that require expertise and training and requires additional accessories (e.g. pipette, surface, etc.), Additionally, the blood collection tube is required to be opened, exposing the sample to possible contamination. Also, the user is exposed to blood that is on pipette and on the surface.

The devices of the present invention address the drawbacks of current approaches. In particular, the devices of the present invention provide for accumulating a certain sample volume inside a confined space with access to the capillary described above (sampler). Thus, in certain embodiments, the invention provides for using a single disposable that enables drawing blood out of a tube (without opening it) into a reservoir or chamber and allowing access with a capillary to that reservoir or chamber. This disposable will remain clean of blood from the outside and can be safely disposed. Moreover, the reservoir is configured to hold the blood without spilling it, even when tilted.

Figure 2:
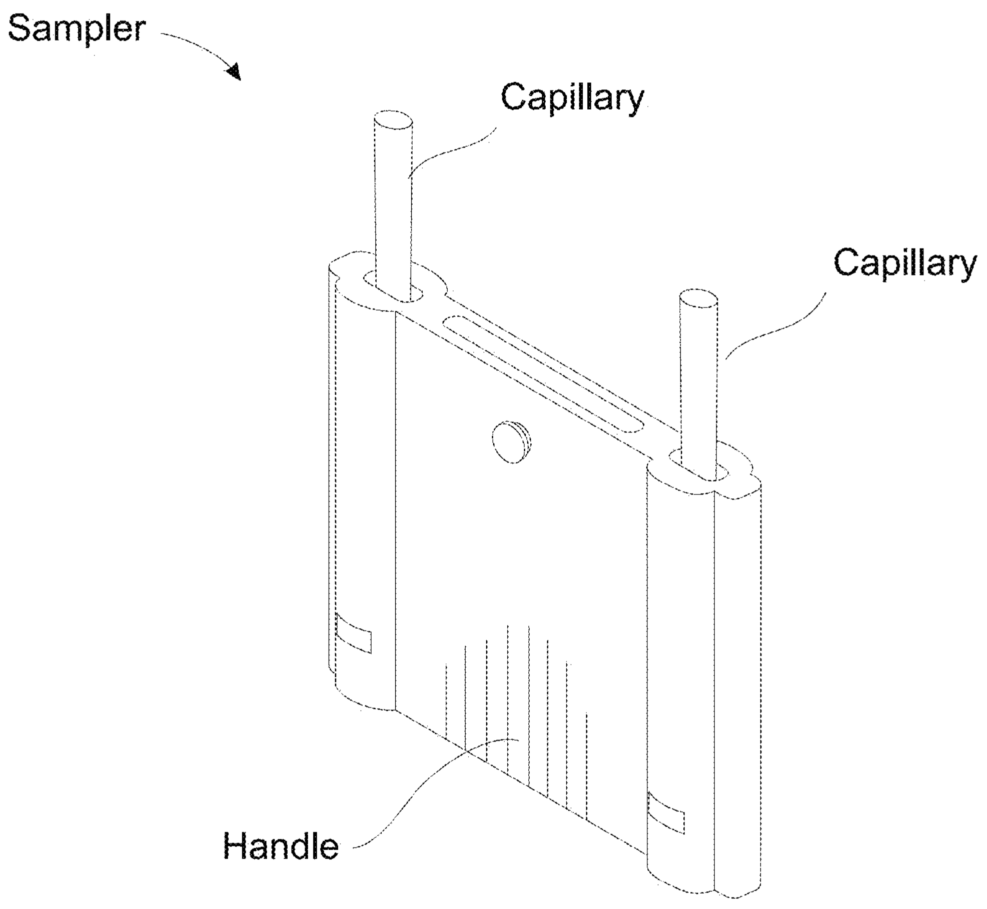
FIG. 2 is a perspective view of an exemplary sampler member consistent with the present disclosure.

The devices of the invention provide numerous advantages over the prior art. For example, the devices of the invention provide for ease of collecting the sample with a sampler. For example, FIG. 2 is a perspective view of an exemplary sampler with which the devices of the present invention are compatible. As shown, the sampler includes two capillaries attached to a handle member. However, it should be noted that a sampler may include any number of capillaries, including a single capillary, or more than two capillaries. Each capillary is able to draw a fluid sample within by way of capillary action, at which point, the sampler may then be used, in conjunction with a cartridge, with an analysis instrument to analyze the fluid sample. Various embodiments of a sampler are described in at least U.S. Pat. Nos. 9,222,935; 9,597,504; and 9,625,357, the contents of each of which are hereby incorporated by reference in their entireties.

The reservoir size of a device of the invention is designed such that capillaries of a sampler can be inserted deep enough into the reservoir to easily load the sampler. The devices are designed to prevent overflow. The first and second component are designed to interact in a manner that pumping action becomes ineffective once the reservoir is filled and no more sample can be withdrawn unless the reservoir is emptied. The reservoir is designed to prevent spillage by having a configuration in which weak capillary forces hold the withdrawn blood inside the reservoir even when the test tube is moved or turned around. These forces do not prevent collecting the blood sample with the sampler. The device has an ease of pumping action and stability (i.e., a base of the second component is sized and shaped to allow pressing the test tube against a table). The size of the opening allows the easy insertion of the capillaries into the reservoir. In certain embodiments, the material is transparent in order to allow the user to see when the reservoir is full, and that the capillaries are in contact with the sample.

Particular embodiments of the invention are now described below. The following description refers to the fluid sample as being a blood sample. It should be noted that the fluid sample may include biological sample of any kind, including a human bodily fluid, and may be collected in any clinically acceptable manner. A body fluid is a liquid material derived from, for example, a human or other mammal, Such body fluids include, but are not limited to, mucous, blood, plasma, serum, serum derivatives, bile, blood, maternal blood, phlegm, saliva, sputum, sweat, amniotic fluid, menstrual fluid, mammary fluid, follicular fluid of the ovary, fallopian tube fluid, peritoneal fluid, urine, semen, and cerebrospinal fluid (CSF), such as lumbar or ventricular CS. A sample also may be media containing cells or biological material. A sample may also be a blood clot, for example, a blood clot that has been obtained from whole blood after the serum has been removed. In certain embodiments, the sample is blood collected from the subject.

The device of the present invention comprises a first component comprising a hollow piercing member and a second component comprising a reservoir arranged to receive a fluid sample from the hollow piercing member. The hollow piercing member is configured to penetrate a seal of a closed chamber that includes a fluid sample (i.e., a vacutainer including a human bodily fluid, such as blood), wherein, upon entering the closed chamber, a portion of the fluid sample may flow from the closed chamber, via a pumping action, and through the hollow piercing member, and into the reservoir. In particular, the first component may include a pumping mechanism, which may be in the form of flanged member (i.e., a step or an abrupt increase in diameter) configured to engage and apply pressure upon a seal in a cap of the closed chamber. Accordingly, upon pressing the closed chamber against the first component, the flanged member or step of the first component presses against the seal, which, in turn, creates pumping motions (via the flexibility of the seal), thereby creating pressure within the closed chamber and causing fluid sample to expel from the closed chamber, through the hollow piercing member, and subsequently into the reservoir. The second component of the device further comprises an opening in a sidewall of the reservoir to permit access to the fluid sample collected in the reservoir. More specifically, the opening in the sidewall is generally sized to receive an open end of a collection tube of a sampler device, such as a capillary tube, wherein the opening is sized to permit angled entry of a capillary tube therethrough. The reservoir is configured to retain a volume of fluid sample within by way of capillary force to thereby prevent undesired flow of fluid sample through the opening in the sidewall.

Accordingly, the device of the present invention is able to extract a fluid sample from the closed chamber while maintaining the chamber in a closed state, thereby preventing risk of contamination to the entirety of the fluid sample stored within the closed chamber and further preventing risk of cross-contamination to the extracted fluid sample. The device further allows for relative ease of collection of a volume of fluid sample from the reservoir via a collection tube (i.e., capillary tube) of a sampler device, as the opening in the sidewall allows for proper alignment and capillary orientation of the collection tube, such that any operator, regardless of skill or expertise, can collect a volume of fluid sample. Furthermore, fluid sample is maintained within the reservoir due to the presence of weak capillary forces, even in the event that the device and closed chamber (from which the fluid sample is extracted) are manipulated (i.e., moved around and/or tilted at varying angles), thereby preventing spillage of the fluid sample, while still permitting withdrawal of a volume of fluid sample via the collection tube of the sampler device (i.e., the capillary force of the collection tube is greater than the weak capillary forces of the reservoir). The device design further obviates the need for a separate pipette and/or disposable clean-surface previously required, thereby pre serving a clean and safe working environment.

Figure 3:
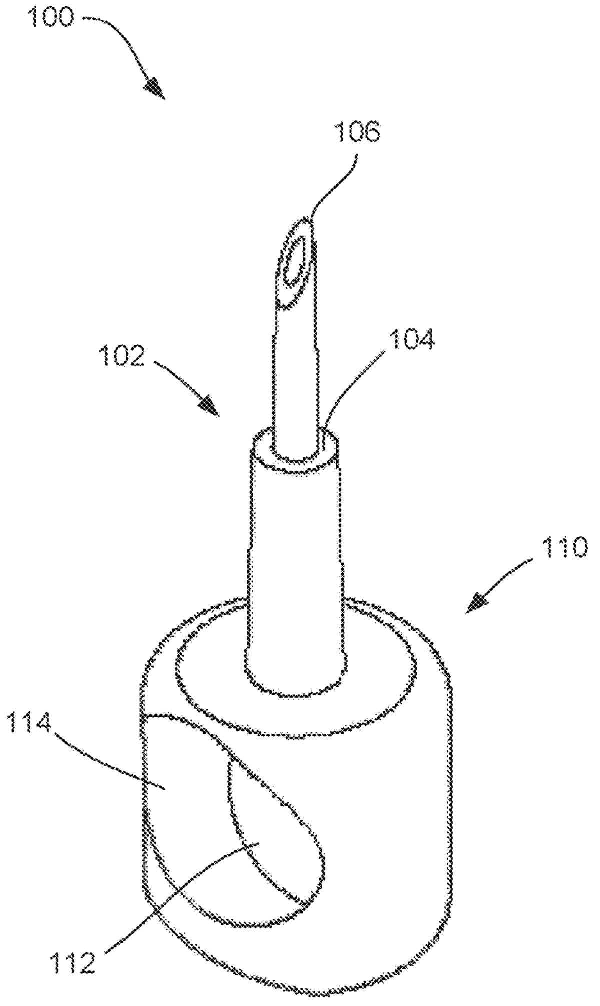
FIG. 3 is a perspective view of one embodiment of a device for extracting a fluid sample from a closed chamber consistent with the present disclosure illustrating first and second components integrally formed with one another.
Figure 4:
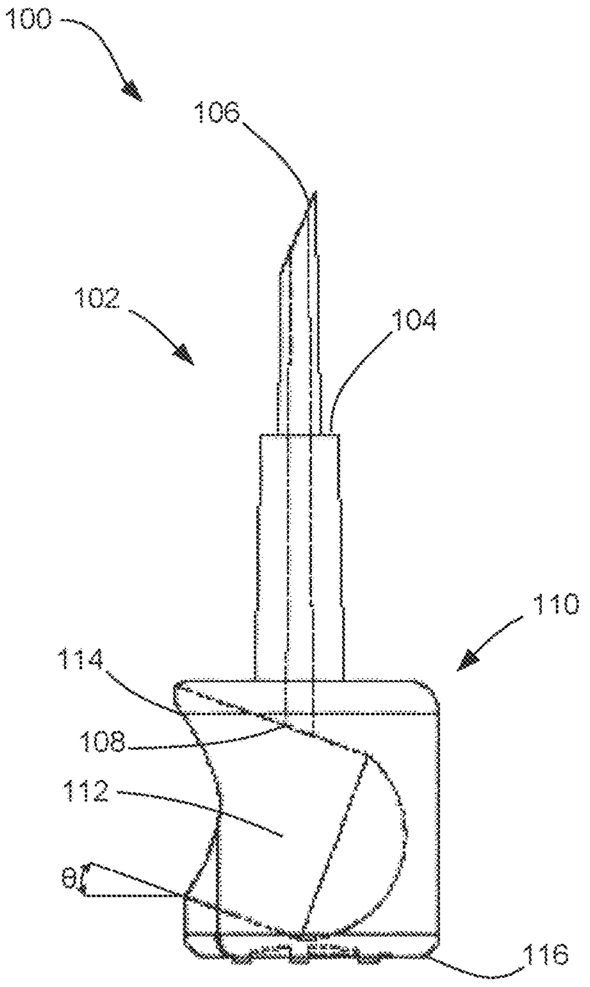
FIG. 4 is a side view, in phantom, of the device of FIG. 3.

FIG. 3 is a perspective view of one embodiment of a device 100 for extracting a fluid sample from a closed chamber. FIG. 4 is a side view, in phantom, of the device 100, The device 100 includes a first component 102 and a second component 110 integrally formed with each other to provide a one-piece design. The first component 102 includes a pumping mechanism 104 and a hollow piercing member 106 and the second component 110 includes a reservoir 112 arranged to receive a fluid sample from the hollow piercing member 106. The second component 110 further includes an opening 114 in a sidewall of the reservoir 112 to permit access to the fluid sample collected in the reservoir 112.

As shown, the hollow piercing member 106 generally defines a cannulated body including a proximal end 108 and an opposing distal tip configured to pierce or penetrate a seal or stopper of a closed chamber (i.e., tube or vial, such as a vacutainer tube), wherein the cannulated body defines a lumen providing a pathway entirely therethrough for receipt of a fluid sample from the distal tip to the proximal end 108. The hollow piercing member 106 is configured to penetrate a seal of a closed chamber that includes a fluid sample, such as a vacutainer including a human bodily fluid. Upon entering the closed chamber, a portion of the fluid sample may flow from the closed chamber, via a pumping action, and through the hollow piercing member 106, and into the reservoir 112. In particular, the pumping mechanism 104 of the first component 102 may be in the form of flanged member 104 (i.e., a step or an abrupt increase in diameter) configured to engage and apply pressure upon a seal in a cap of the closed chamber. Accordingly, upon pressing the closed chamber against the first component 102, the flanged member or step 104 of the first component 102 presses against the seal, which, in turn, creates pumping motions (via the flexibility of the seal), thereby creating pressure within the closed chamber and causing fluid sample to expel from the closed chamber, through the hollow piercing member 106, and subsequently into the reservoir 112.

The reservoir 112 of the second component 112 is in fluid communication with the pathway of the lumen of the cannulated body of the hollow piercing member 106, thereby allowing for the reservoir to receive fluid sample flowing through the hollow piercing member 106. The reservoir is designed (i.e., shaped and/or sized) so as to control the volume of fluid sample that may be dispensed within via the hollow piercing member 106. For example, the reservoir may have a height determinative of volume of sample to be received and/or a distance from a bottom of the reservoir 112 to the proximal end of the hollow piercing member 106, which, together with its width, determines the overall volume of fluid sample that can be received. For example, in one embodiment, the device 100 is configured such that transfer of the fluid sample through the hollow piercing member 106 to the reservoir 112 becomes ineffective once the proximal end 108 of the hollow piercing member 106 is submerged in the fluid sample in the reservoir 112. In particular, flow of fluid sample into the reservoir 112 ceases and pumping action (i.e., pressing of the closed chamber upon the device 100) once the reservoir 112 reaches a filled volume and the proximal end 108 is in contact with the filled volume, such that no more fluid sample can be extracted from the closed chamber until a volume of fluid sample is withdrawn from the reservoir 112. In some embodiments, the reservoir 112 has a volume in the range of approximately 50 μl to 200 μl. In one embodiment, the reservoir 112 has a volume in the range of approximately 100 μl to 120 μl. It should be noted that the reservoir 112 may have other volumes ranging between 0.1 ml to 5 ml, for example, depending on the application and the amount of fluid sample required for a given test.

The reservoir 112 is configured to retain a volume of fluid sample within the reservoir 112 by way of capillary force to thereby prevent undesired flow of fluid sample through the opening 114 in the sidewall. Accordingly, even in the event that the device 100 and closed chamber (from which the fluid sample is extracted) are manipulated (i.e., moved around and/or tilted at varying angles), fluid sample within the reservoir 112 is maintained within and spillage of the fluid sample is prevented.

The opening 114 in the sidewall is sized to receive an open end of a collection tube of a sampler member or device. In particular, the opening 114 may be configured to receive a capillary within and further allow an open end of the capillary to contact fluid sample within the reservoir 112 and thereby allow for transfer of a volume of fluid sample from the reservoir 112 into the capillary. For example, in some embodiments, the side opening pathway comprises a diameter in the range of approximately 1 mm to 5 mm, and, more specifically, a diameter of approximately 4.5 mm. In some embodiments, a first end of the side opening (end that is proximate an exterior surface of the body of the second component) comprises a diameter greater than a diameter of a second end of the side opening (end that is proximate the reservoir). In some embodiments, the opening 114 in the sidewall is sized to permit angled entry of the capillary of a sample member through the opening 114. For example, the opening 114 may include a pathway is oriented at an angle θ in the range of approximately 10 degrees to 80 degrees. Furthermore, the opening 114 in the sidewall may be located proximate a top of the reservoir 112.

The device 100, including both the first and second components 102 and 110 may include one or more medical grade and biocompatible materials. The one or more medical grade materials may include, but are not limited to, polycarbonate, polystyrene, polyethylene, polypropylene, and copolymers. Furthermore, in some embodiments, the first and/or second components 102, 110 may be formed from an optically transparent material. For example, in some embodiments, at least the second component 110 is optically transparent. Accordingly, an operator may easily observe the extraction of fluid sample into the reservoir to determine when it is full and further observe contact of a collection tube of a sampler device with fluid sample in the reservoir, thereby assisting the operator with withdrawal of a volume of fluid sample from the reservoir.

It should be noted that, in other embodiments, the first and second components may be separately constructed and assembled to one another to provide a device for extracting a fluid sample from a closed chamber, as described in greater detail herein.

Figure 5:
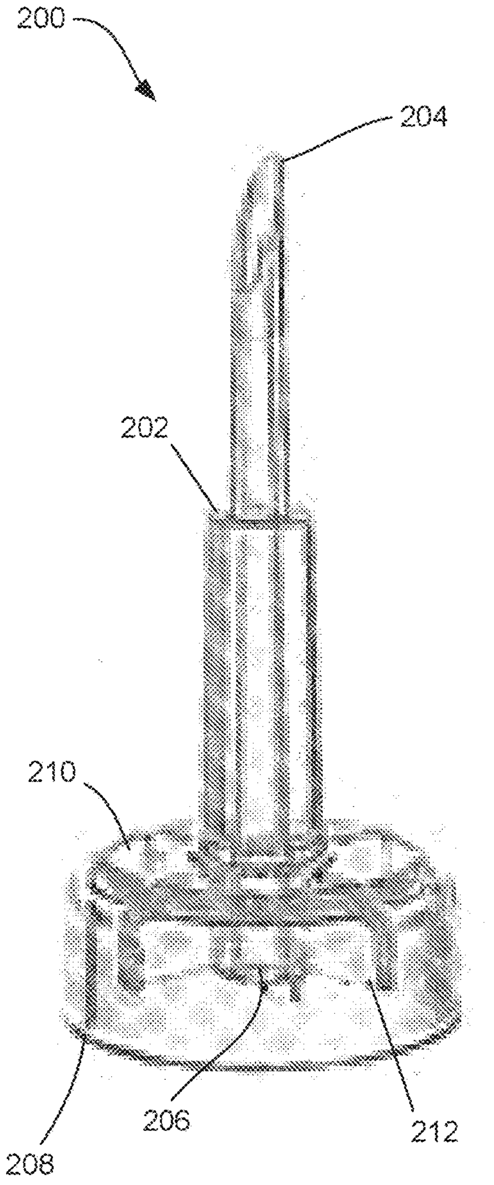
FIG. 5 is a side view, in phantom, of one embodiment of a first component consistent with the present disclosure and configured to be operably coupled to separately-constructed second components consistent with the present disclosure.

For example, FIG. 5 is a side view, in phantom, of one embodiment of a first component 200 consistent with the present disclosure and configured to be operably coupled to a separately constructed second component consistent with the present disclosure (such as one of the second components 300 or 400 illustrated in FIGS. 6-14). As shown, the first component 200 of FIG. 5 has similar features of the first component 102 of FIGS. 3 and 4. In particular, the first component 200 includes a pumping mechanism 202 (i.e., a flanged member, step, or an abrupt increase in diameter) and a hollow piercing member 204 configured to function in a similar manner as previously described. For example, the hollow piercing member 204 generally defines a cannulated body including a proximal end 206 and an opposing distal tip configured to pierce or penetrate a seal or stopper of a closed chamber (i.e., tube or vial, such as a vacutainer tube), wherein the cannulated body defines a lumen providing a pathway entirely therethrough for receipt of a fluid sample from the distal tip to the proximal end 108. The hollow piercing member 204 is configured to penetrate a seal of a closed chamber that includes a fluid sample, such as a vacutainer including a human bodily fluid, Upon entering the closed chamber, a portion of the fluid sample may flow from the closed chamber, via a pumping action, and through the hollow piercing member 204, and into a reservoir of a separately constructed second component (i.e., one of second components 300 and 400 of FIGS. 6-14), as will be described in greater detail herein. In particular, the flanged member, step, abrupt increase in diameter 104 is configured to engage and apply pressure upon a seal in a cap of the closed chamber. Accordingly, upon pressing the closed chamber against the first component 200, the flanged member or step 202 presses against the seal, which, in turn, creates pumping motions (via the flexibility of the seal), thereby creating pressure within the closed chamber and causing fluid sample to expel from the closed chamber, through the hollow piercing member 204. The first component 200 further includes a base member (from which the hollow piercing member 204 extends) including a proximal end 208, and opposing distal end 210, and one or more internal supports 212, one or inure of which is configured to be directly coupled to a second component by way of adhesion, heat, welding, and/or mechanical fitment, such as a snap-fit connection. It should be noted that, in some embodiments, the first component 200 may include an off-the-shelf, commercially available product upon which separately constructed second components 300 and 400 may be fitted and operably coupled thereto.

Figure 6:
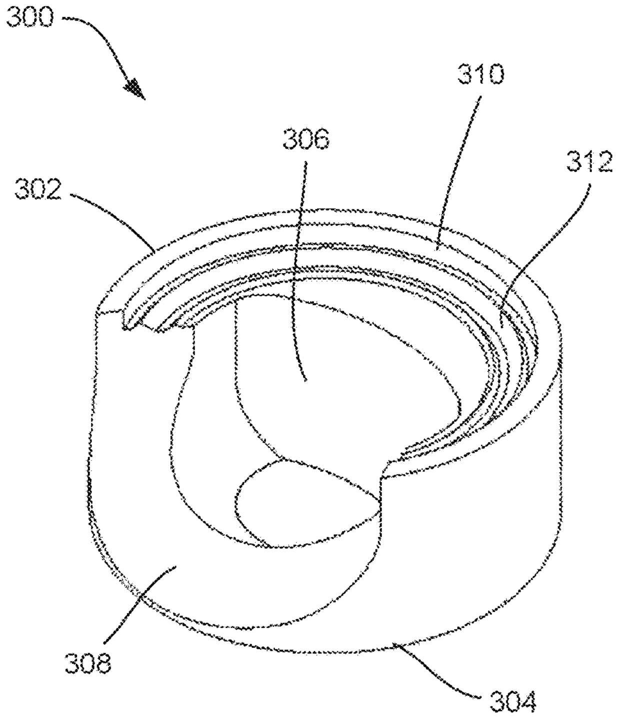
FIG. 6 is a perspective view of one embodiment of a second component consistent with the present disclosure and configured to be operably coupled to the separately constructed first component of FIG. 5 by way of a fixed coupling method, such as adhesion, heat, and/or welding.

FIG. 6 is a perspective view of one embodiment of a second component 300 configured to be operably coupled to the separately constructed first component 200 by way of a fixed coupling method, such as adhesion, heat, and/or welding. As shown, the second component 300 includes a top portion 302 and a base portion 304. The second component 300 further includes a reservoir 306 arranged to receive a fluid sample from the hollow piercing member 204 and an opening 308 in a sidewall of the reservoir 306 to permit access to the fluid sample collected in the reservoir 306. The reservoir 306 and opening 308 are similar in design and function as the reservoir 112 and opening 114 of the second component 110 of the device 100 previously described herein. It should be noted that the base portion 304 of the second component 300 may be sized and configured to allow for pressing of a closed chamber against the assembled device (i.e., the first component 200 coupled with the second component 300) while the device is on a surface, without the device slipping on the surface. The second component 300 further includes one or more features to assist in the coupling of the first component 200 thereto, particularly in a fixed fashion. For example, the second component 300 may include one or more channels, cavities, or ribs, such a ribbing 310 and cavity 312 for receiving an adhesive and directing ultrasonic energy to fix at least the proximal end 208 or internal supports 212 of the first component 200 to the top portion 302 of the second component 300. It should be noted that the second component may be formed by way of an injection mold construction and provides a relatively simple construction devoid of undercuts, thereby providing ease of manufacture.

Figure 7:
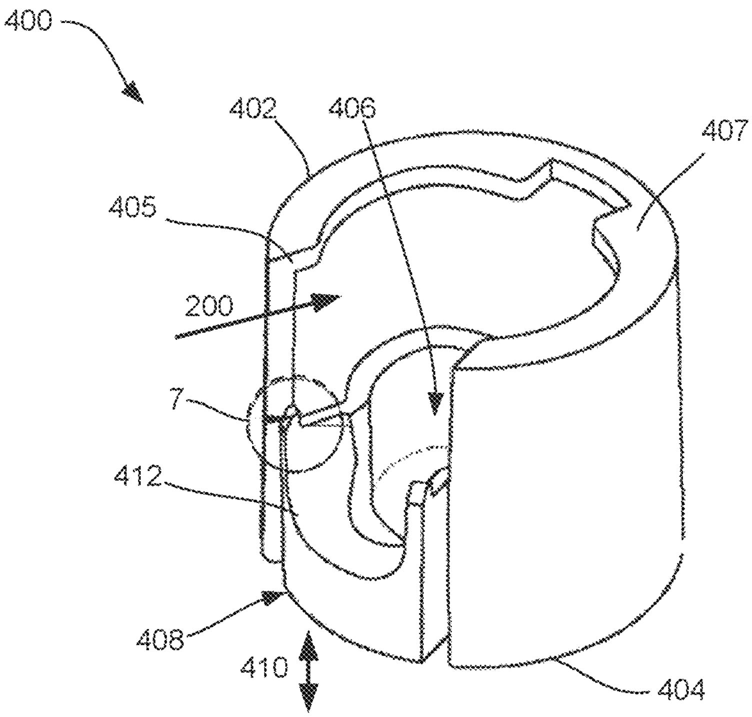
FIGS. 7 and 8 are top and bottom perspective views, respectively, of another embodiment of a second component consistent with the present disclosure and configured to be operably coupled to the separately constructed first component of FIG. 5 by way of a snap-fit connection.
Figure 8:
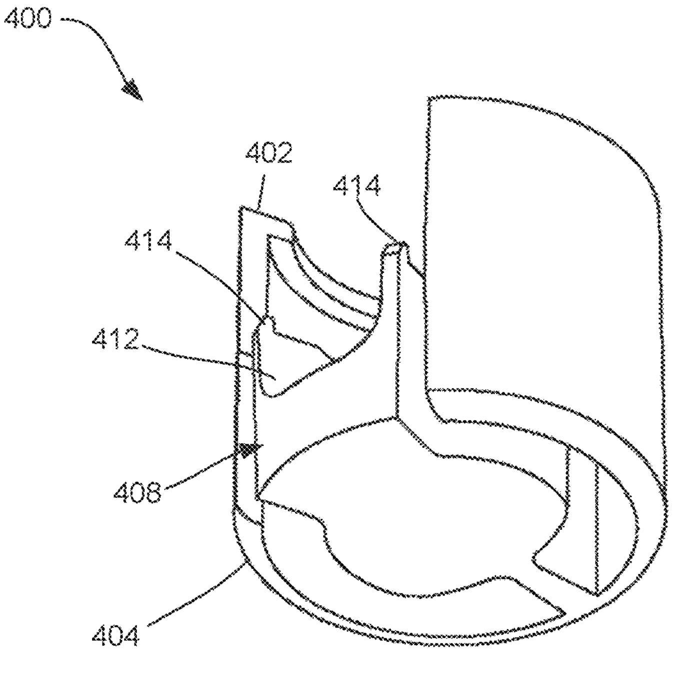
Figure 9:
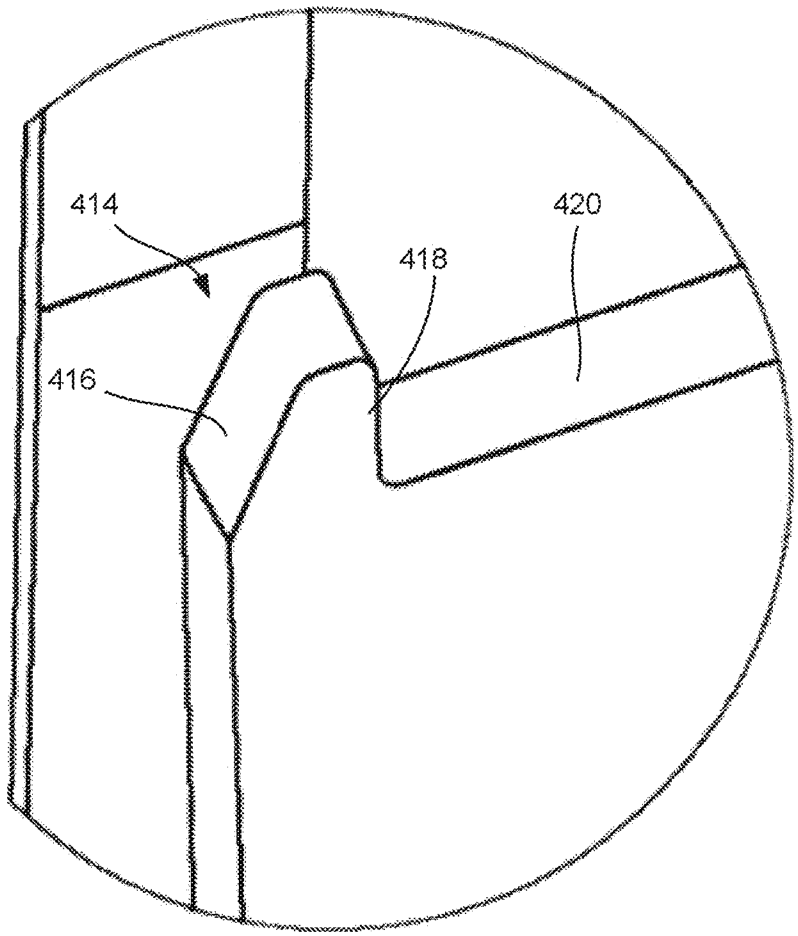
FIG. 9 is an enlarged perspective view of a portion of a retaining member of the second component configured to apply a biasing force upon the first component upon positioning of the first component into snap-fit engagement with second component and further illustrating teeth of the retaining member that prevent disengagement of the first and second components.

FIGS. 7 and 8 are top and bottom perspective views, respectively, of another embodiment of a second component 400 configured to be operably coupled to the separately constructed first component 200 by way of a snap-fit connection. The second component 400 includes a top portion 402 and a base portion 404. As will be described in greater detail herein, the top portion 402 is configured to provide a means of engaging a portion of the first component 100 and retaining the first component 100 in a connection with the second component 400. In particular, the top portion 402 includes side opening 405 shaped and/or sized so as to accommodate the base member of the first component 200, including the proximal end 208 and opposing distal end 210, such that a user need only slide the based member of the first component 200 into the second component 400 through the side opening 405. The top portion 402 of the second component 400 further includes an internal flange member or lip 407 configured to overlap at least a portion of the distal end 210 of the base member of the first component 200, thereby preventing or reducing vertical movement or pull of the first component 200 relative to the second component 400. The second component 400 further includes a reservoir 406 arranged to receive a fluid sample from the hollow piercing member 204 and a retaining member 408 configured to apply a biasing force upon a portion of the first component 200 upon positioning of the first component 200 into a snap-fit engagement with second component 400. In particular, the retaining member 408 is configured to flex, as indicated by arrows 410, so as to accommodate the base member of the first component 200 (upon sliding of the first component 200 into engagement with the second component 400) and further apply a biasing force upon the base member of the first component 200, wherein the retaining member 408 further includes teeth 414 to engage a portion of the first component 200 and prevent or reduce movement of the first component 200 in a lateral direction and ultimately prevent disengagement of the first and second components from one another. The reservoir 406 is formed within the retaining member 408. The second component 400 further includes an opening 412 in a sidewall of the retaining member 408 proximate the reservoir 406 to permit access to the fluid sample collected in the reservoir 406. The reservoir 406 and opening 412 are similar in design and function as the reservoir 112 and opening 114 of the second component 110 of the device 100 previously described herein, FIG. 9 is an enlarged perspective view of a portion of the retaining member 408 of the second component 400 illustrating teeth 414 of the retaining member 408 in greater detail. As shown, each tooth 414 includes a ramp member 416 upon which the proximal end 208 of the base member of the first component 200 engages when the first component 200 is sliding into connection with the second component 400. The retaining member 408 is configured to flex so as to allow the base member of the first component to slide over the teeth 414 along each ramp member 416, and, upon passing over the ramp member 416, the proximal end 208 of the base member of the first component 200 becomes seated and rests upon a support surface 420 of the retaining member 408 and the retaining member applies a biasing force upon the first component 100. As shown, an edge 418 of each tooth 414 essentially locks into engagement with an exterior surface of the base member of the first component 100, thereby preventing or reducing movement of the first component 200 in a lateral direction and ultimately preventing disengagement of the first and second components from one another.

Figure 10:
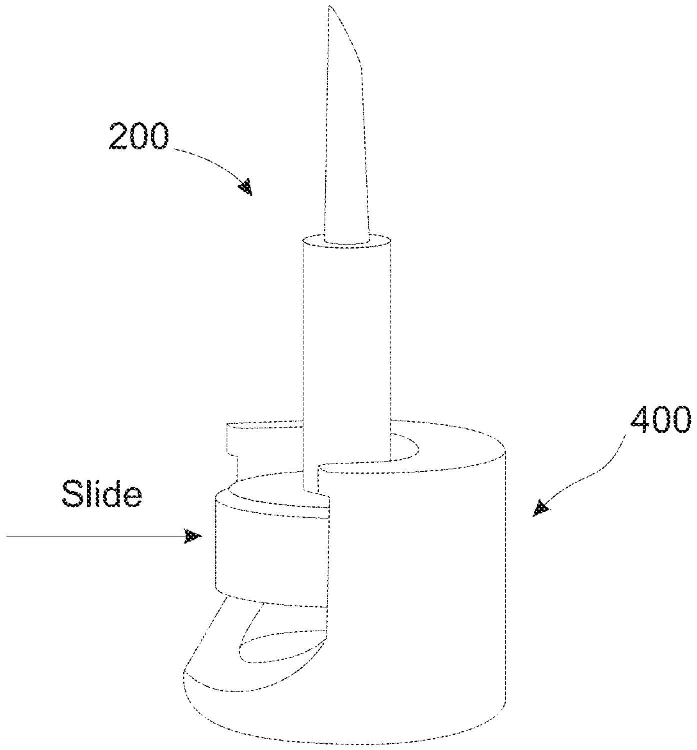
FIGS. 10 and 11 are side and top views, in phantom, respectively, illustrating the first component of FIG. 5 in snap-fit engagement with the second component of FIGS. 7 and 8, further illustrating an internal flange member or lip of the second component overlapping a portion of the first component preventing or reducing vertical movement or pull of the first component relative to the second component.
Figure 11:
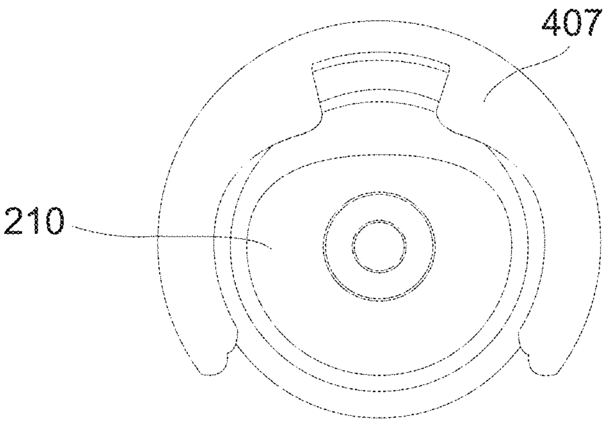

FIGS. 10 and 11 are side and top views, in phantom, respectively, illustrating the first component 200 in snap-fit engagement with the second component 400, further illustrating the internal flange member or lip 407 of the second component 400 overlapping a portion of the first component 200, thereby preventing or reducing vertical movement or pull of the first component 200 relative to the second component 400.

Figure 12:
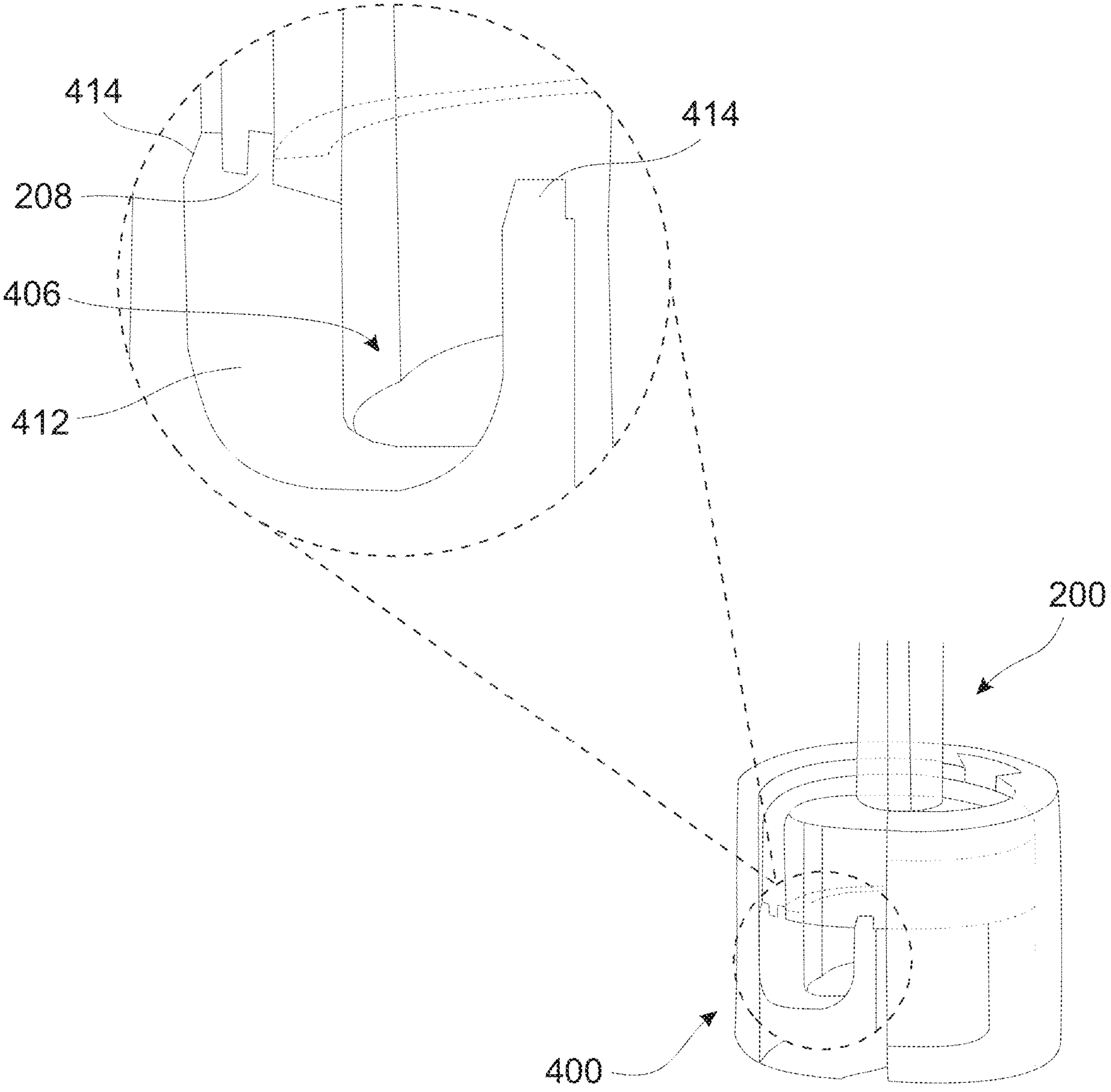
FIG. 12 is a perspective side view, in phantom, illustrating the first component of FIG. 5 in snap-fit engagement with the second component of FIGS. 7 and 8, further illustrating the teeth of the retaining member of the second component in engagement a portion of the first component preventing or reducing movement of the first component in a lateral direction and ultimately preventing disengagement of the first and second components from one another.

FIG. 12 is a perspective side view, in phantom, illustrating the first component 200 in snap-fit engagement with the second component 400, further illustrating the teeth 414 of the retaining member 408 of the second component 400 in engagement a portion of the first component 200 preventing or reducing movement of the first component 200 in a lateral direction and ultimately preventing disengagement of the first and second components from one another, wherein the opening 412 and the reservoir 406 are accessible.

Figure 13:
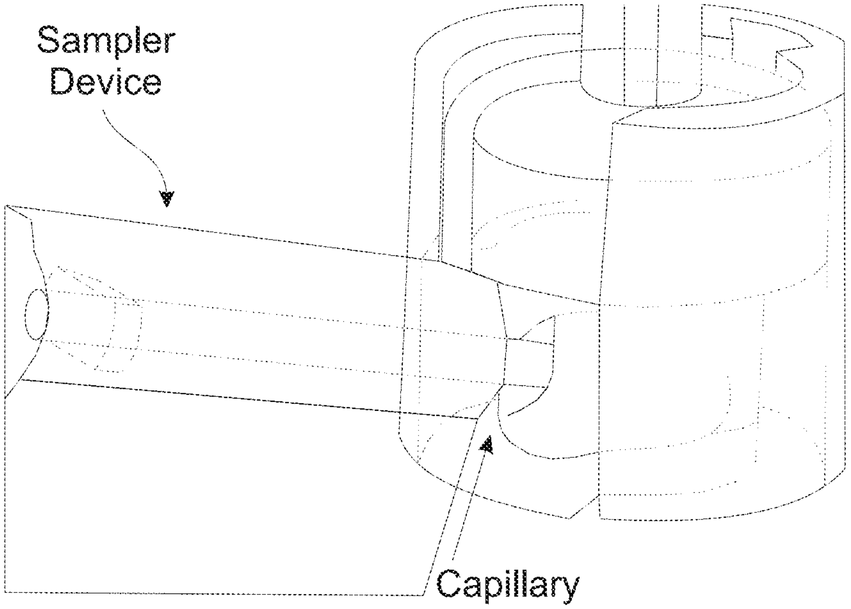
FIGS. 13 and 14 are side perspective views, in phantom, illustrating positioning of a collection tube (capillary tube) of a sampler device into the reservoir via the sidewall opening of the second component and subsequent withdrawal of a volume of fluid sample from the reservoir.
Figure 14:
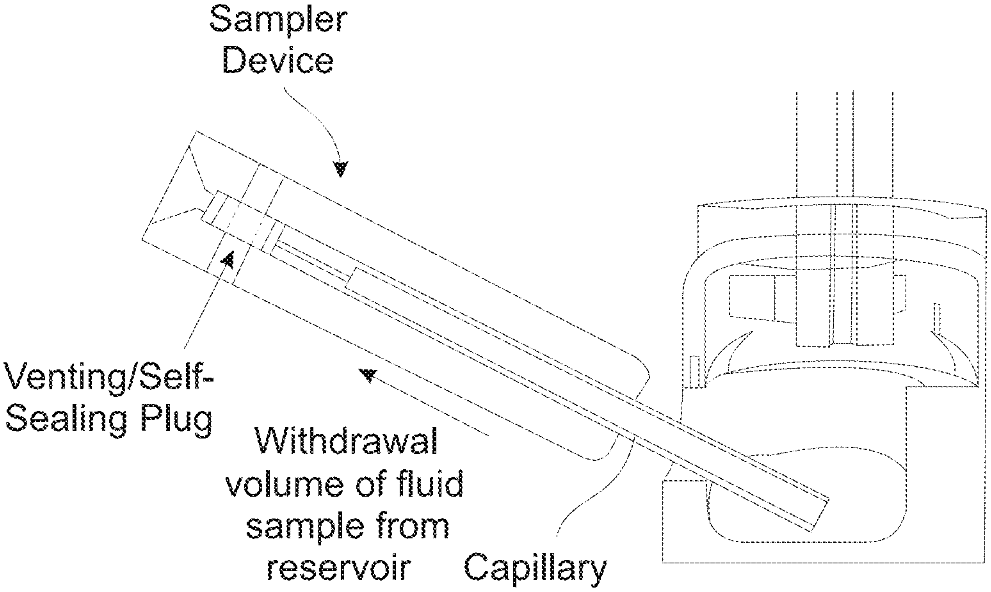

FIGS. 13 and 14 are side perspective views, in phantom, illustrating positioning of a collection tube (capillary tube) of a sampler device into the reservoir via the sidewall opening of the second component and subsequent withdrawal of a volume of fluid sample from the reservoir. As shown, the opening in the sidewall is generally sized to receive an open end of a collection tube of a sampler device, such as a capillary tube, wherein the opening is sized to permit angled entry of a capillary tube therethrough. As further illustrated, the capillary tube may include a venting and self-sealing plug at a proximal end thereof. The plug is venting to thereby allow for the fluid sample to flow into and fill the capillary tube by way of capillary action. The plug is configured to further provide a seal so as to prevent fluid sample from passing out of the proximal end.

It should be noted that various embodiments of a sampler device, as well as a corresponding cartridge for receipt of the sampler device and a compatible diagnostic instrument for analyzing the fluid sample, and methods of use are described in at least U.S. Pat. Nos. 9,222,935; 9,592,504; and 9,625,357, the contents of each of which are hereby incorporated by reference in their entireties.

Figure 15A:
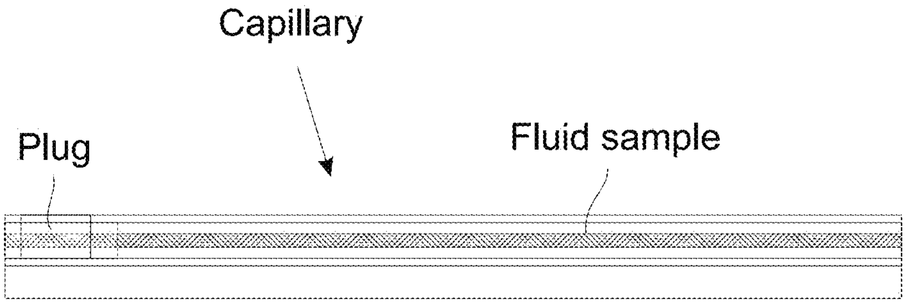
FIG. 15A illustrates a filled capillary tube of a sampler device.
Figure 15B:
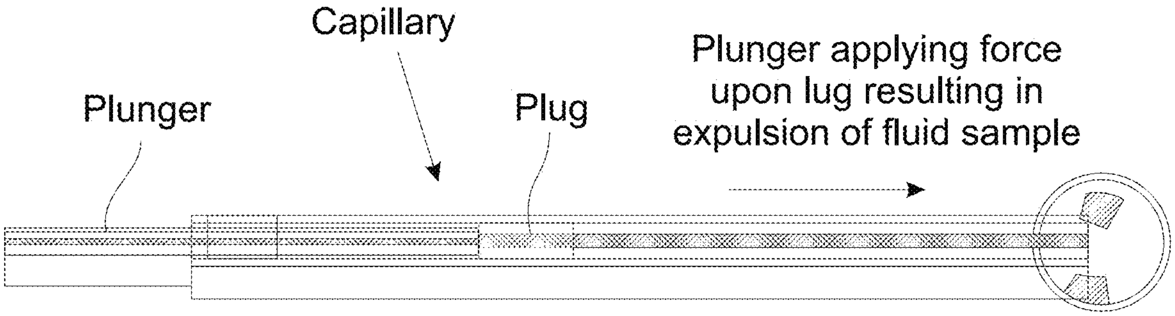
FIG. 15B illustrates an exemplary method of collecting a volume of the fluid sample from the capillary tube to be analyze upon loading of a disposable cartridge having the sampler device coupled thereto into a compatible diagnostic instrument.
Figure 15C:
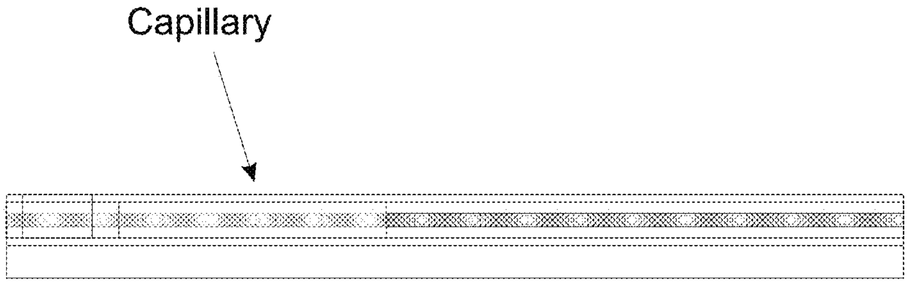
FIG. 15C illustrates a capillary tube having remaining fluid sample therein.

FIG. 15A illustrates a filled capillary tube of a sampler device. FIG. 15B illustrates an exemplary method of collecting a volume of the fluid sample from the capillary tube to be analyze upon loading of a disposable cartridge having the sampler device coupled thereto into a compatible diagnostic instrument and FIG. 15C illustrates a capillary tube having remaining fluid sample therein. As described in at least U.S. Pat. Nos. 9,222,935; 9,592,504; and 9,625,357, a diagnostic instrument, into which a cartridge (including the sampler device coupled thereto) has been loaded, may include a plunger or other mechanism for contacting the plug of a capillary, wherein the plunger is used to push a volume of fluid sample out of the capillary to undergo analysis.

FIGS. 16A-16C illustrate a sequence of steps for extracting fluid sample from a closed chamber with a device and further loading a sample member with a volume of extracted fluid sample retained within a reservoir of the device. FIG. 16A illustrates penetration of a seal of a closed chamber (illustrated as a vacutainer containing a blood sample) with the hollow piercing member of the device. FIG. 16B illustrates extraction of a volume of blood from the vacutainer into the reservoir of the device by way of a pumping action (i.e., pressing the vacutainer against the device, thereby causing flexing of the septum of the vacutainer and pressure buildup within, ultimately causing expulsion of blood through the hollow piercing member and into the reservoir. FIG. 16C illustrates withdrawal of a volume of blood from the reservoir into a capillary tube of a sample member upon entry of the capillary tube into the opening in a sidewall of the reservoir. The sample member may then be fitted with a disposable cartridge for delivering the volume of extracted blood sample to a compatible diagnostic instrument for analyzing the blood sample.

Accordingly, the device of the present invention is able to extract a fluid sample from the closed chamber while maintaining the chamber in a closed state, thereby preventing risk of contamination to the entirety of the fluid sample stored within the closed chamber and further preventing risk of cross-contamination to the extracted fluid sample. The device further allows for relative ease of collection of a volume of fluid sample from the reservoir via a collection tube (i.e., capillary tube) of a sampler device, as the opening in the sidewall allows for proper alignment and capillary orientation of the collection tube, such that any operator, regardless of skill or expertise, can collect a volume of fluid sample. Furthermore, fluid sample is maintained within the reservoir due to the presence of weak capillary forces, even in the event that the device and closed chamber (front which the fluid sample is extracted) are manipulated (i.e., moved around and/or tilted at varying angles), thereby preventing spillage of the fluid sample, while still permitting withdrawal of a volume of fluid sample via the collection tube of the sampler device (i.e., the capillary force of the collection tube is greater than the weak capillary forces of the reservoir). The device design further obviates the need for a separate pipette and/or disposable clean-surface previously required, thereby preserving a clean and safe working environment.

Figure 17:
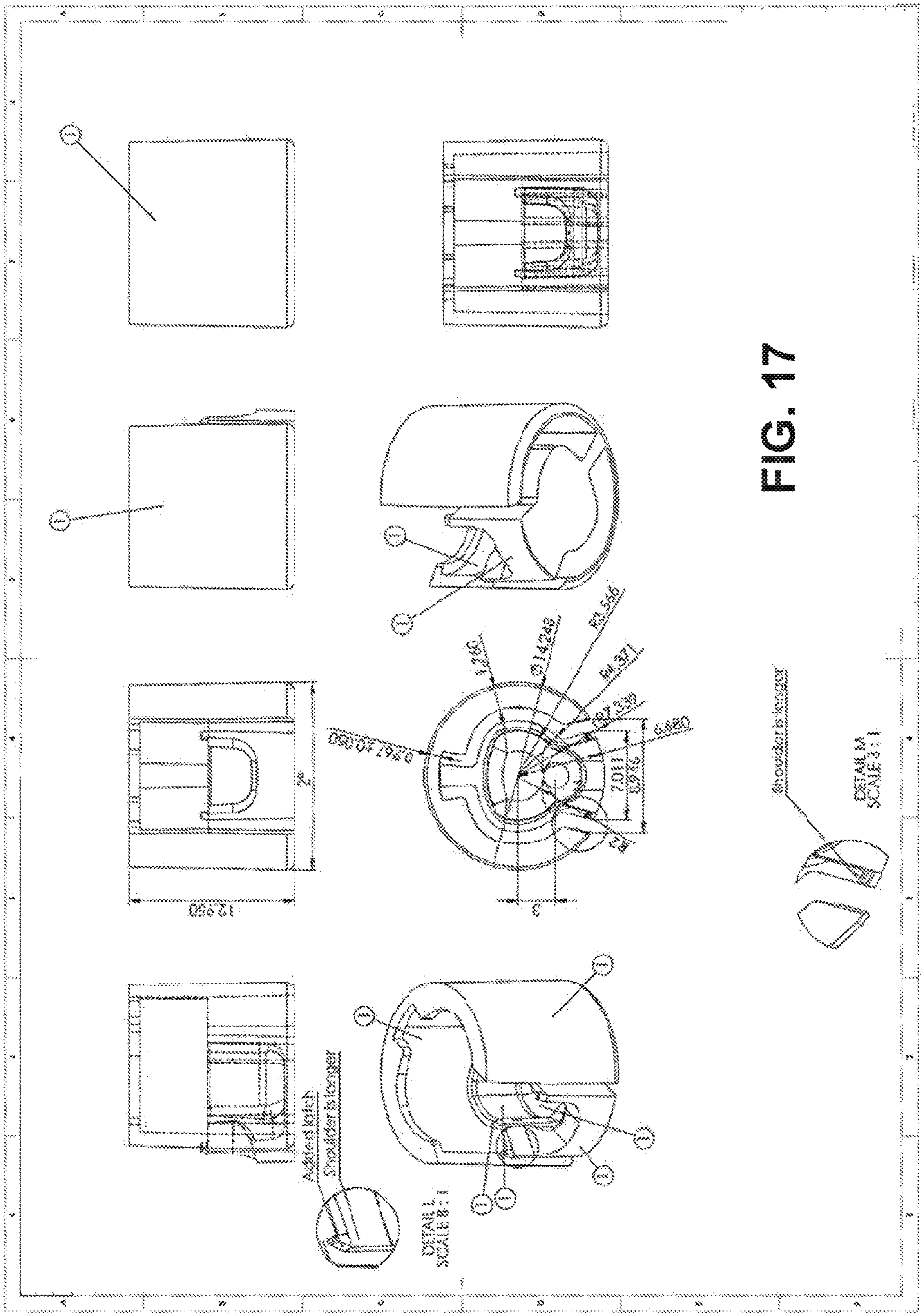
FIG. 17 depicts various views of the second component of FIGS. 7 and 8 in CAD illustrations.
Figure 18:
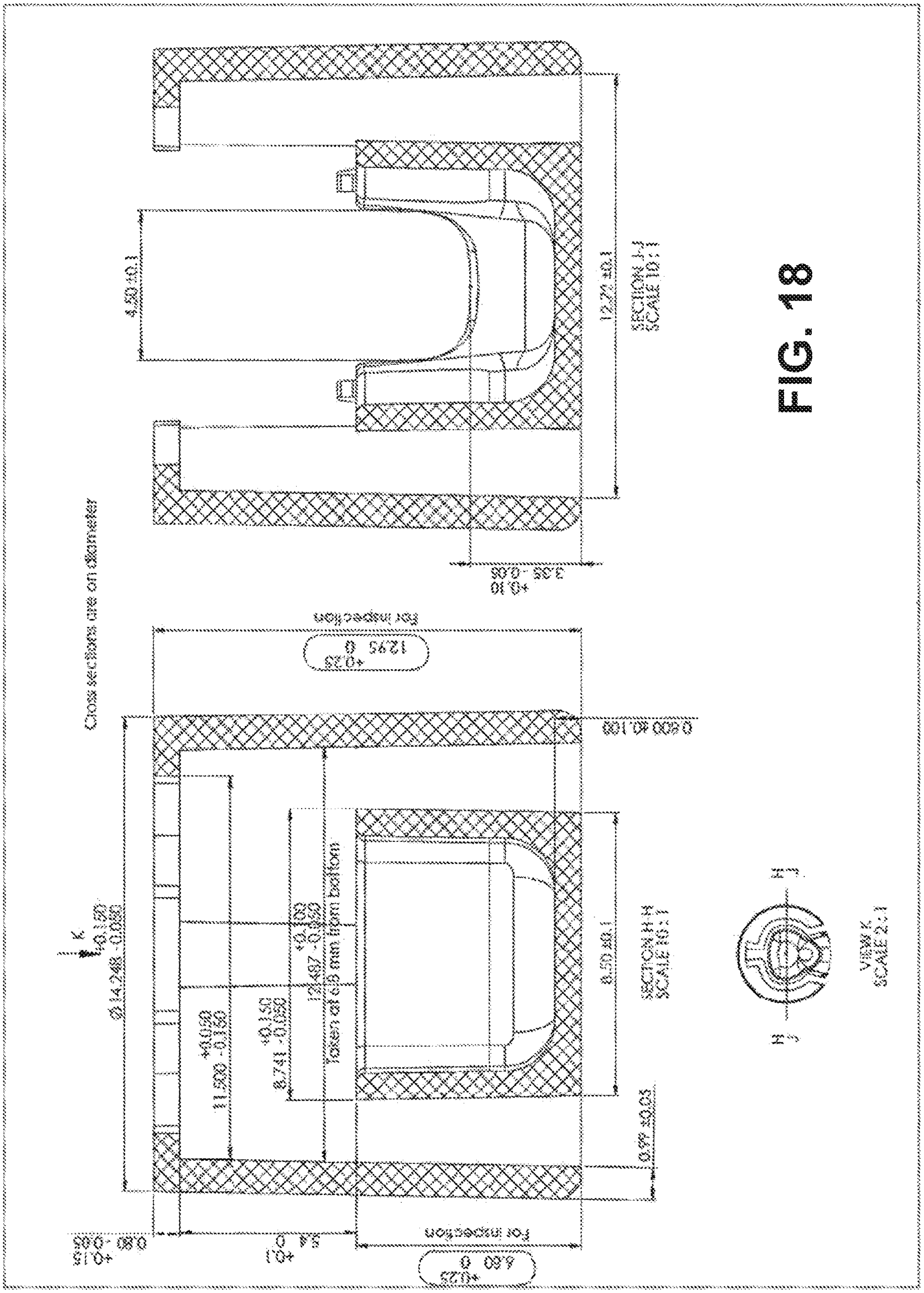
FIG. 18 depicts side, cross-sectional views of the second component of FIGS. 7 and 8 in CAD illustrations.
Figure 19:
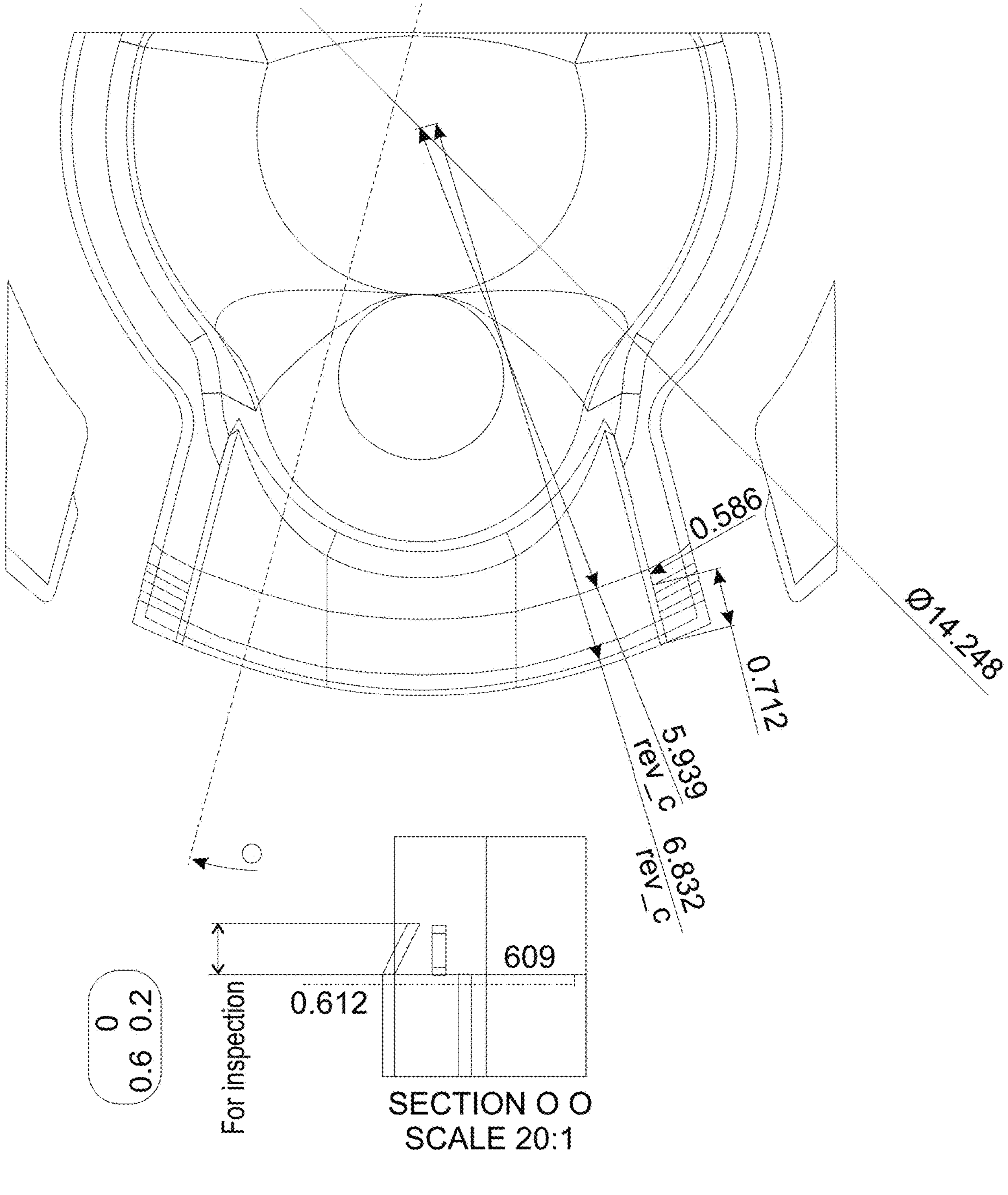
FIG. 19 depicts top views of portions of the second component of FIGS. 7 and 8 in CAD illustrations.

FIGS. 17, 18, and 19 depict an exemplary embodiment of a second component in CAD illustration and providing specific dimensions. FIG. 17 depicts various views of the second component of FIGS. 7 and 8 in CAD illustrations. FIG. 18 depicts side, cross-sectional views of the second component of FIGS. 7 and 8 in CAD illustrations. FIG. 19 depicts top views of portions of the second component of FIGS. 7 and 8 in CAD illustrations.

Reference, throughout this specification to "one embodiment" or "an embodiment" means that a particular feature, structure, or characteristic described in connection with the embodiment is included in at least one embodiment. Thus, appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

INCORPORATION BY REFERENCE

References and citations to other documents, such as patents, patent applications, patent publications, journals, books, papers, web contents, have been made throughout this disclosure. All such documents are hereby incorporated herein by reference in their entirety for all purposes.

EQUIVALENTS

Various modifications of the invention and many further embodiments thereof, in addition to those shown and described herein, will become apparent to those skilled in the art from the full contents of this document, including references to the scientific and patent literature cited herein. The subject matter herein contains important information, exemplification and guidance that can be adapted to the practice of this invention in its various embodiments and equivalents thereof.

What is claimed is:

1. A device for extracting a fluid sample from a closed chamber having a flexible seal, the device comprising:
- a first component comprising: a pumping mechanism and a hollow piercing member having a proximal end and an opposing distal piercing tip; and
- a second component comprising:
- a flat shaped base positioned opposite and at the distal end of the device relative to the tip of the piercing member,
- an open reservoir positioned within second component between said base and said first component wherein the bottom of the reservoir proximal to the base comprises an opposing inner top face of the base, the open reservoir comprising
- a first opening connected to the proximal end of the first component and arranged to receive the fluid sample from the hollow piercing member, wherein the first opening is positioned at an upper part of the reservoir relative to the base, and
- a second permanent opening in a sidewall extending upwardly from the base, wherein said open reservoir comprising the second permanent opening is arranged to receive and collect the fluid sample from the first component through the first opening.

2. The device of claim 1, wherein the pumping mechanism comprising an abrupt radial increase in diameter to form a protruded step on said piercing member, wherein the protruded step when used with a chamber having a flexible seal wider than the step presses against the flexible seal when the closed chamber is pressed towards the base thereby creating pressure within the closed chamber, causing the fluid sample to be expelled from the closed chamber through the hollow piercing member and into the reservoir.

3. The device of claim 1, wherein the second permanent opening in the sidewall is located proximate a top of reservoir.

4. The device of claim 1, wherein the top of the second permanent opening relative to the base is positioned at the same or at a higher level than the top of the first opening, relative to the base.

5. The device of claim 1, wherein the permanent opening in the sidewall is sized and oriented in an angled orientation relative to the base to permit angled entry of the sample collection tube through the permanent opening.

6. The device of claim 1, wherein said reservoir is arranged to receive and collect the fluid sample from the first component through the first opening until filling capacity is reached while said second permanent opening is open, wherein the first opening is positioned to be in contact and submerged in the fluid sample when said filling capacity is reached, and wherein the second permanent opening is sized to retain the fluid sample within the reservoir by way of capillary forces.

7. The device of claim 1, wherein at least the second component is optically transparent.

8. The device of claim 1, wherein the base portion of the second component is further sized and shaped to exert the pressing with a force directed towards said closed chamber by pressing the closed chamber against the device while said base of the device is on a surface, without the device slipping on the surface.

9. The device of claim 1, wherein the first and second components are integrally formed with each other.

10. The device of claim 1, wherein the first and second components are separate components that operably couple to each other.

11. The device of claim 10, wherein the first and second components are operably coupled to one another by way of a snap-fit connection and the second component comprises one or more teeth that prevent disengagement of the first and second components, wherein the device is shaped receive a fluid sample from the hollow piercing member while the components are coupled by said snap-fit connection.

12. The device of claim 2, wherein said maintaining of filled condition is additionally maintained while device is tilted.

13. The device of claim 1, wherein the second permanent opening in the sidewall is oriented at an angle in relation to the base in the range of approximately 10 degrees to 80 degrees to thereby permit said angled entry.

14. The device of claim 1, wherein the open reservoir is sized and shaped to hold volumes ranging between 0.1 ml to 5 ml.

15. The device of claim 1, wherein the open reservoir is sized and shaped to hold volumes ranging between 100 μl to 120 μl.

16. The device of claim 1, wherein the second permanent opening in a sidewall of the reservoir has a diameter in the range of approximately 1 mm to 5 mm.

17. The device of claim 1, wherein the permanent opening in the sidewall has a geometry to permit the straight entrance to the bottom of the reservoir of a straight tube in an angle relative to the base.

* * * * *